US012138885B2

(12) United States Patent
Ford et al.

(10) Patent No.: US 12,138,885 B2
(45) Date of Patent: Nov. 12, 2024

(54) METHODS AND SYSTEMS FOR PREPARING BLANKS FOR FORMING CARRIERS FOR CONTAINERS

(71) Applicant: Graphic Packaging International, LLC, Atlanta, GA (US)

(72) Inventors: Colin P. Ford, Woodstock, GA (US); David F. Warner, Waynesville, NC (US); Jason C. Anderson, Marietta, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 102 days.

(21) Appl. No.: 17/951,199

(22) Filed: Sep. 23, 2022

(65) Prior Publication Data

US 2023/0101990 A1 Mar. 30, 2023

Related U.S. Application Data

(60) Provisional application No. 63/261,582, filed on Sep. 24, 2021.

(51) Int. Cl.
*B31D 5/04* (2017.01)
*B65D 71/50* (2006.01)

(52) U.S. Cl.
CPC .............. *B31D 5/04* (2013.01); *B65D 71/504* (2013.01)

(58) Field of Classification Search
CPC ........ B31D 5/04; B65D 71/504; B65D 71/42; B65B 41/10; B65B 43/24; B65B 61/08; B65B 61/12; B65B 17/025

(Continued)

(56) References Cited

U.S. PATENT DOCUMENTS 3,032,944 A * 5/1962 Hull ...................... B65B 17/025 53/543
3,336,723 A * 8/1967 Shazor, Jr. ............ B65B 17/025 198/379

(Continued)

FOREIGN PATENT DOCUMENTS

| | | | |
|---|---|---|---|
| EP | 0 686 561 B1 | 4/1999 |
| EP | 2 085 314 A2 | 8/2009 |
| WO | WO 2009/046237 A1 | 4/2009 |

OTHER PUBLICATIONS

International Search Report and Written Opinion for PCT/US2022/044473 dated Jan. 20, 2023.

*Primary Examiner* — Thomas M Wittenschlaeger
*Assistant Examiner* — Katie L Gerth
(74) *Attorney, Agent, or Firm* — Womble Bond Dickinson (US) LLP

(57) ABSTRACT

A method for processing at least one blank for forming a carrier for containers includes obtaining at least one blank including a central panel having plurality of container openings and at least one container retention tab extending into respective container openings of the plurality of container openings. The method further includes inserting the at least one blank into a blank infeed assembly, moving the at least one blank from the infeed assembly to a blank processing assembly, the blank processing assembly having a forming belt and a forming wheel, moving the at least one blank between the forming belt and the forming wheel, and moving the at least one blank to a product engagement portion of the blank processing assembly such that the at least one blank is positioned for engagement with a group of containers.

19 Claims, 15 Drawing Sheets

(58) Field of Classification Search
USPC ........................................................... 493/88
See application file for complete search history.

(56) References Cited

U.S. PATENT DOCUMENTS

| | | | | | |
|---|---|---|---|---|---|
| 3,494,098 | A * | 2/1970 | Sternau | B65B 7/2885 | 53/329.2 |
| 3,621,628 | A * | 11/1971 | Chidsey, Jr. | B65B 17/025 | 206/150 |
| 3,628,307 | A * | 12/1971 | Croasdale | B65B 7/2807 | 53/299 |
| 3,849,972 | A * | 11/1974 | Pepmeier | B65B 7/165 | 53/329.2 |
| 3,991,640 | A * | 11/1976 | Schlueter | B26D 1/28 | 83/356.3 |
| 4,018,027 | A * | 4/1977 | Curry | B65D 71/504 | 53/48.2 |
| 4,160,353 | A * | 7/1979 | Ganz | B65B 21/24 | 53/48.9 |
| 5,088,269 | A * | 2/1992 | Thelen | B65D 71/504 | 53/48.2 |
| 5,579,625 | A * | 12/1996 | Olson | B65B 17/025 | 53/134.1 |
| 5,592,804 | A * | 1/1997 | Reuteler | B65B 21/24 | 53/48.9 |
| 5,813,193 | A * | 9/1998 | Chan | B65B 17/025 | 53/442 |
| 9,776,750 | B2 * | 10/2017 | May | B65B 49/14 | |
| 9,815,605 | B2 * | 11/2017 | Bates | B65D 71/504 | |
| 10,071,828 | B2 * | 9/2018 | Moncrief | B65B 51/02 | |
| 11,167,870 | B2 * | 11/2021 | Karst | B65B 21/242 | |
| 11,827,430 | B2 * | 11/2023 | Brink | B65D 5/248 | |
| 11,905,719 | B2 * | 2/2024 | Telleria | B05B 12/00 | |
| 2007/0164489 | A1 * | 7/2007 | Minghetti | B29C 66/112 | 425/383 |
| 2014/0013919 | A1 * | 1/2014 | Gerke | B42C 7/005 | 83/875 |
| 2015/0141229 | A1 * | 5/2015 | Flagg | B31B 50/00 | 493/309 |
| 2018/0362234 | A1 * | 12/2018 | L'Heureux | B65D 71/44 | |
| 2023/0331414 | A1 * | 10/2023 | Look | B65B 41/14 | |
| 2023/0382619 | A1 * | 11/2023 | Ford | B65D 71/42 | |

* cited by examiner

METHODS AND SYSTEMS FOR PREPARING BLANKS FOR FORMING CARRIERS FOR CONTAINERS

CROSS-REFERENCE TO RELATED APPLICATION

This application claims the benefit of U.S. Provisional Patent Application No. 63/261,582, filed on Sep. 24, 2021.

INCORPORATION BY REFERENCE

The disclosure of U.S. Provisional Patent Application No. 63/261,582, filed on Sep. 24, 2021, is hereby incorporated by reference for all purposes as if presented herein in its entirety.

BACKGROUND OF THE DISCLOSURE

The present disclosure generally relates to systems and methods of processing blanks for forming carriers, packages, and/or other suitable constructs. More specifically, the present disclosure is directed to methods and systems for processing blanks and carriers formed therefrom.

SUMMARY OF THE DISCLOSURE

According to one aspect, the disclosure is generally directed to a method for processing at least one blank for forming a carrier for containers, comprising obtaining at least one blank comprising a central panel having plurality of container openings and at least one container retention tab extending into respective container openings of the plurality of container openings. The method further comprises inserting the at least one blank into a blank infeed assembly, moving the at least one blank from the infeed assembly to a blank processing assembly, the blank processing assembly comprising a forming belt, the blank processing assembly further comprising a forming wheel, moving the at least one blank between the forming belt and the forming wheel, and moving the at least one blank to a product engagement portion of the blank processing assembly such that the at least one blank is positioned for engagement with a group of containers.

According to another aspect, the disclosure is generally directed to a system for processing blanks for forming carriers for containers, the system comprising an upstream end, a downstream end defining a machine direction from the upstream end to the downstream end of the system, a blank infeed assembly proximate the upstream end of the system, a blank processing assembly positioned downstream from the blank infeed assembly, the blank processing assembly comprising a forming belt for being driven in a closed path about a plurality of rollers, and a forming wheel rotatably mounted to a support, the forming belt and the forming wheel are arranged such that at least one blank is for being at least partially received between the forming belt and the forming wheel and processed before being moved to a product engagement portion of the blank processing assembly.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of preparing/processing a blank or other construct for further processing and/or for forming carriers for holding products such as containers, e.g., food and beverage containers. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Figure 2:
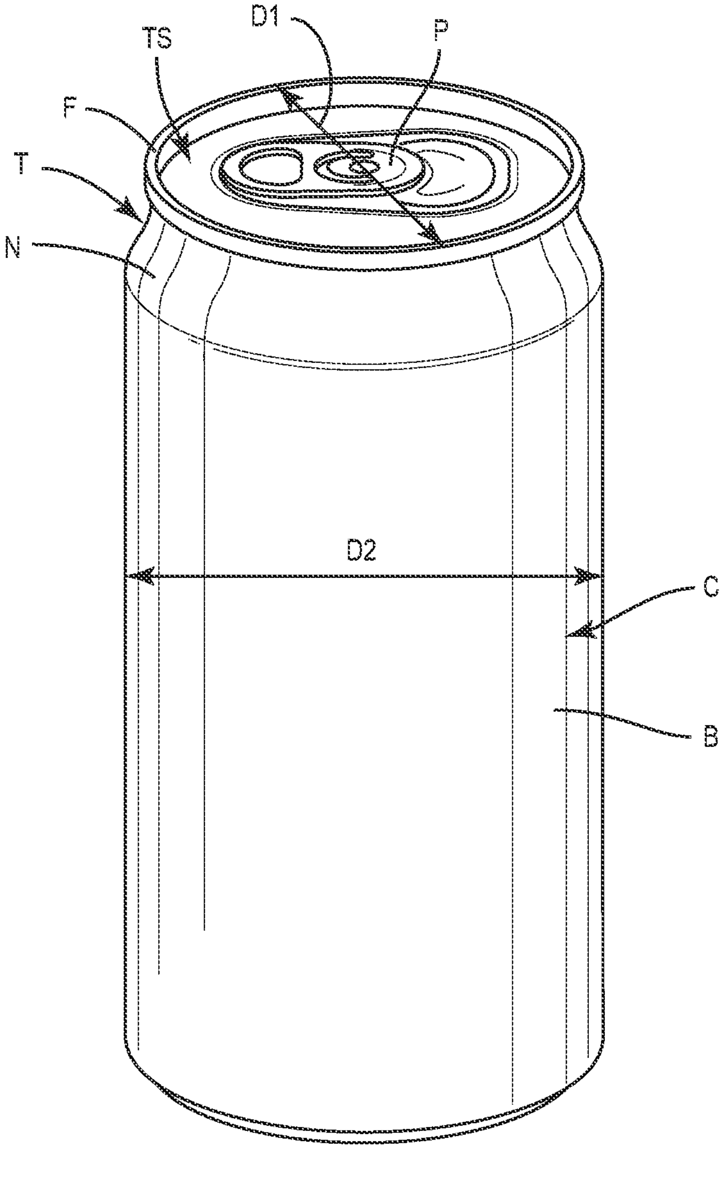
FIG. 2 is a perspective view of a container suitable for use with blanks, carriers, and packages formed by the systems and methods of the present disclosure.

Referring momentarily to FIG. 2, containers for use with the carriers of the present disclosure are illustrated as beverage containers having a lower base portion B, a top portion T generally comprising a neck N that tapers inwardly from the lower base portion, a flange portion F at the top of the neck portion that extends radially outward from the neck portion, and a top surface TS below the flange portion that includes a pull-tab P. In one embodiment, a top and/or bottom end of the container can have diameter D1 of about 66 mm and a central portion of the container can have a diameter D2 of about 202 mm. In another embodiment, a top and/or bottom end of the container can have diameter D1 of about 58 mm and a central portion of the container can have a diameter D2 of about 200 mm. Containers of other sizes, shapes, and configurations, may be held in the carriers without departing from the disclosure. In embodiments, carriers according to the present disclosure can be provided with one or more containers to form a package.

Figure 1:
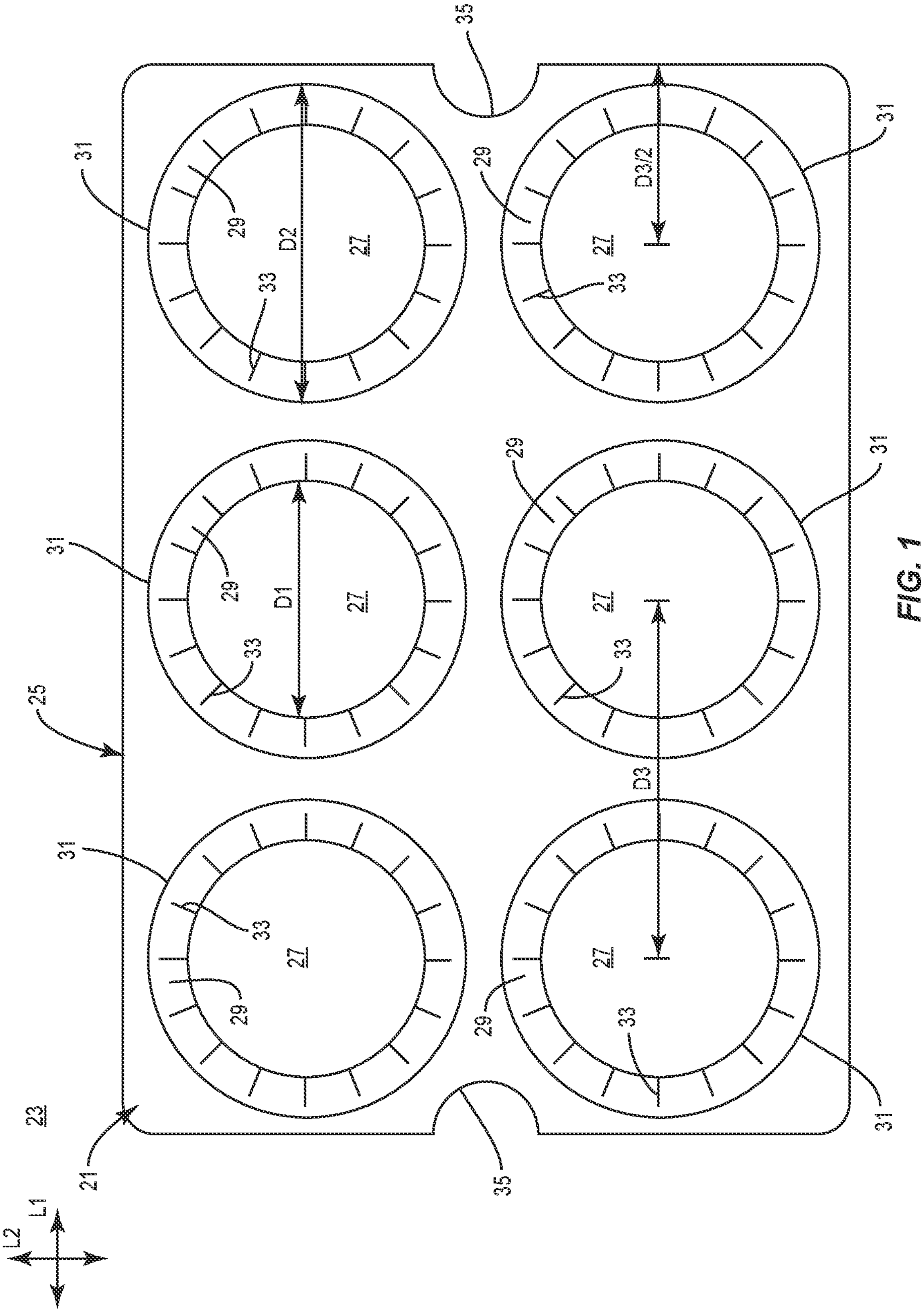
FIG. 1 is a plan view of an exterior surface of a blank for use with systems according to the present disclosure.

Referring to FIG. 1, an exterior surface 21 of a blank 23 for forming a carrier for holding/supporting/dispensing one or more containers is illustrated. The blank 23, as shown, can have a longitudinal axis L1 and a lateral axis L2, and can include a central panel or top panel 25 with container retention features that include a plurality of container retention openings or container openings 27.

As shown, the container openings 27 can be provided in a column and row arrangement in a number that corresponds to a desired number of containers to be held by the carrier formed from the blank 23. While the top panel 25 is shown having container openings 27 provided in two rows/columns of three openings 27 each, it will be understood that a different number and/or arrangement of container openings 27 can be provided without departing from the disclosure.

The container openings 27 can have a generally circular configuration, with container retention tabs 29 foldably connected to the top panel 25 at respective curved fold lines 31/respective portions of a curved fold line 31 and positioned to extend toward the center of the respective container openings 27. It will be understood that the container retention tabs 29 can be provided in a generally abutting circumferential arrangement, separated at respective oblique lines of weakening 33, though spacing could be provided between adjacent container retention tabs 29 without departing from the disclosure.

While the container retention tabs 29 are illustrated as generally trapezoidal or rectangular elements having free edges facing the centers of the respective container openings 27, it will be understood that one or more of the container retention tabs 29 can have a different configuration or arrangement without departing from the disclosure.

As described herein, the container openings 27 are configured for at least partially receiving respective containers, e.g., a top portion T of a respective container, such that the container retention tabs 29 can be urged upwardly at the respective fold line(s) 31 to extend into a portion of the respective containers, e.g., the flange portion F, to provide a secure engagement between the carrier/top panel 25 and the respective containers.

In this regard, preparation/processing of the blank 23 for formation into a carrier can include one or more of separating adjacent container retention tabs 29, e.g., at the lines of weakening 33, and/or at least partially folding the container retention tabs 29 upwardly at the respective fold line(s) 31 (broadly, "pre-breaking") in preparation for at least partially receiving the respective containers.

It will be understood that the blank 23 can have a different configuration without departing from the disclosure.

Figure 3:
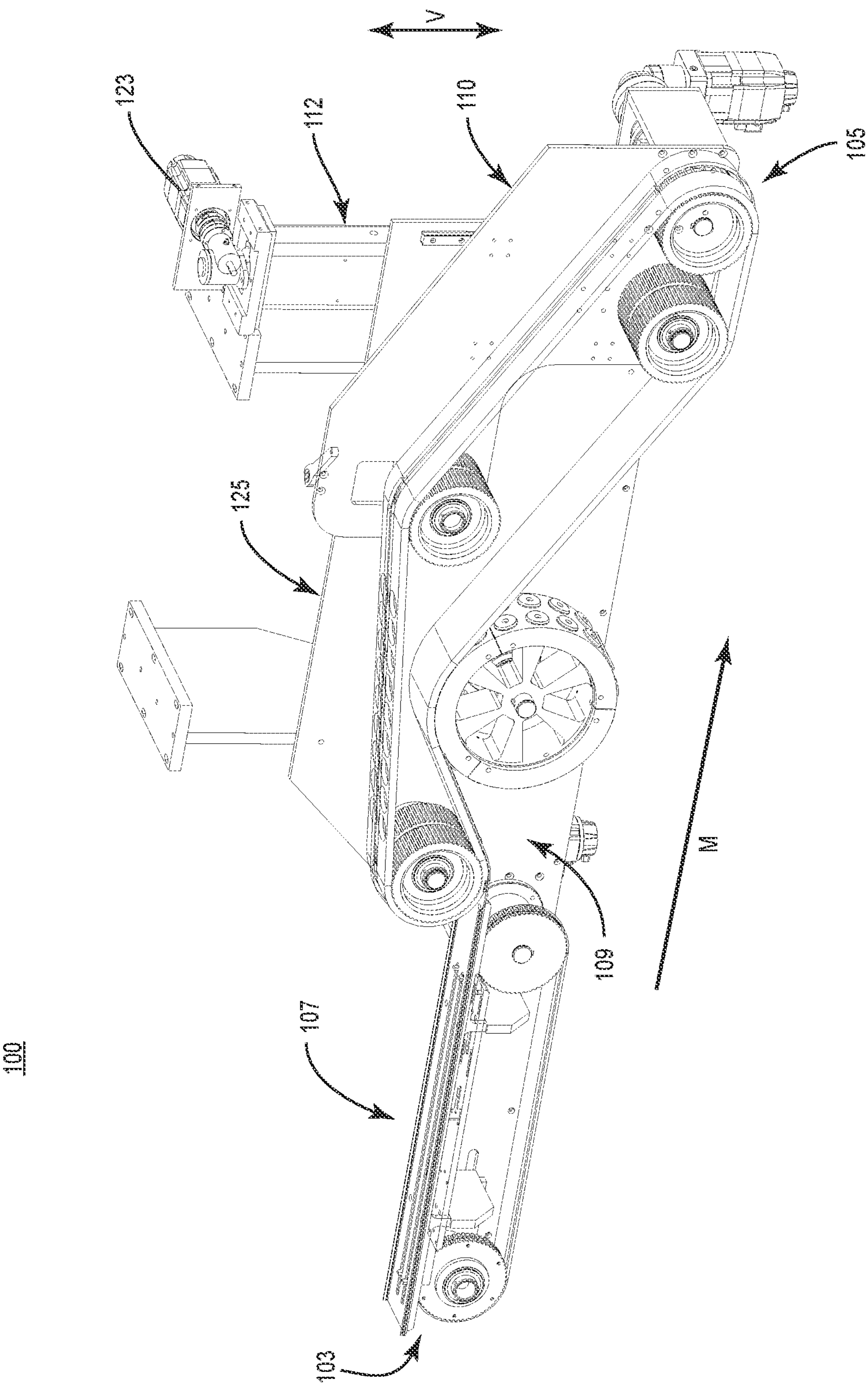
FIG. 3 is a perspective view of a system for processing blanks according to an exemplary embodiment of the disclosure.
Figure 4:
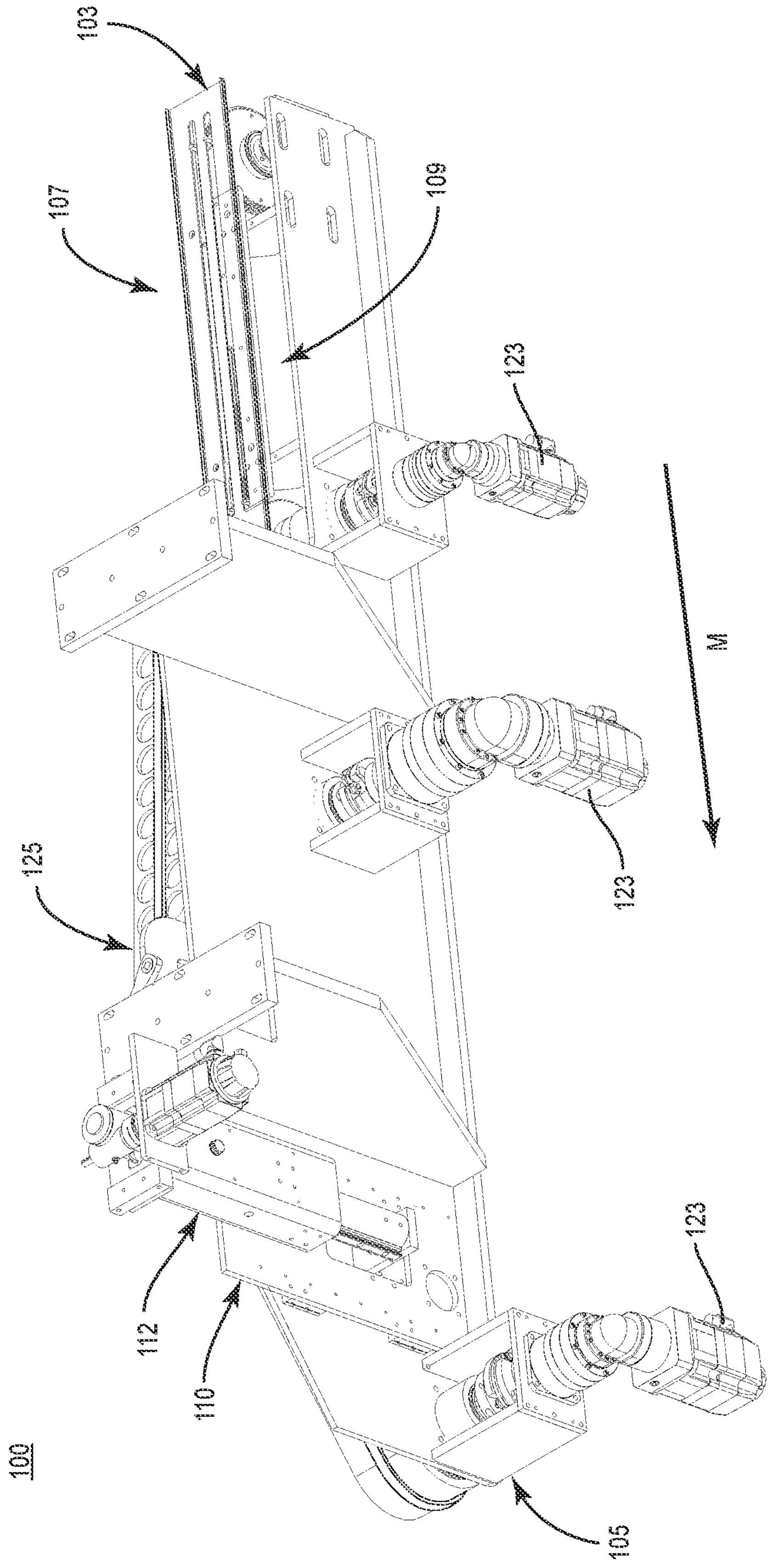
FIG. 4 is another perspective view of the system of FIG. 3.
Figure 5:
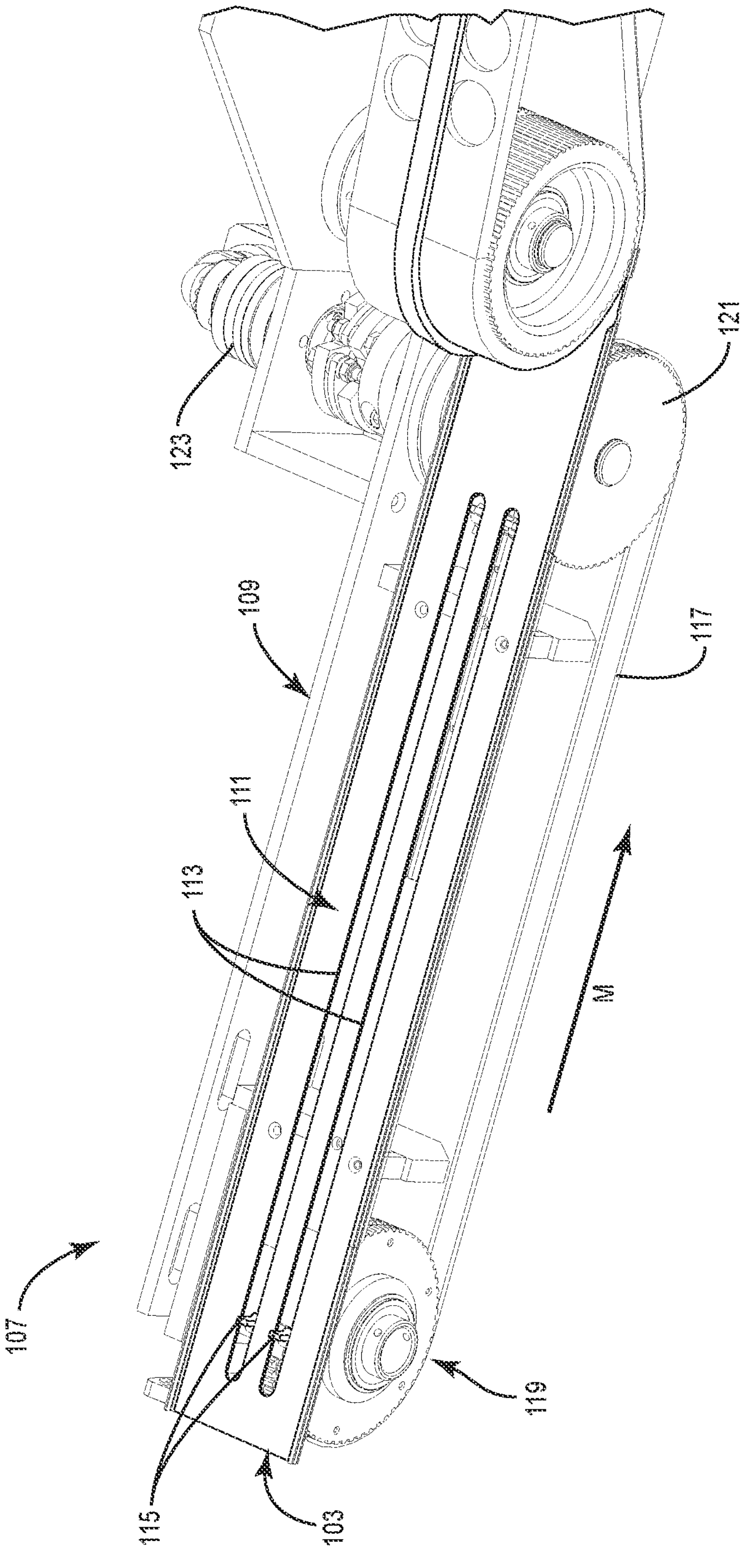
FIG. 5 is an enlarged perspective view of a blank infeed assembly of the system of FIG. 3.
Figure 6:
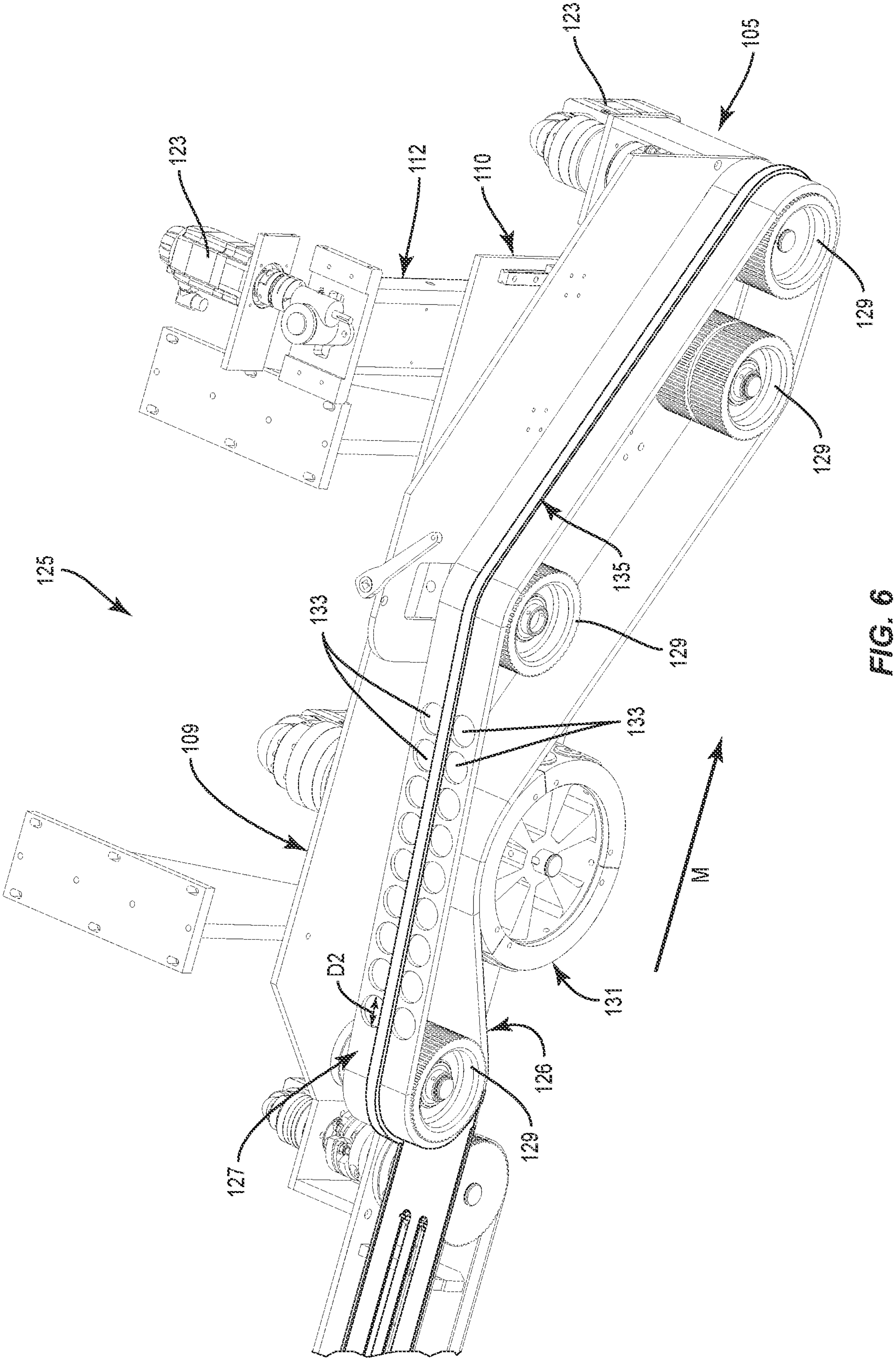
FIG. 6 is an enlarged perspective view of a blank processing assembly of the system of FIG. 3.
Figure 7:
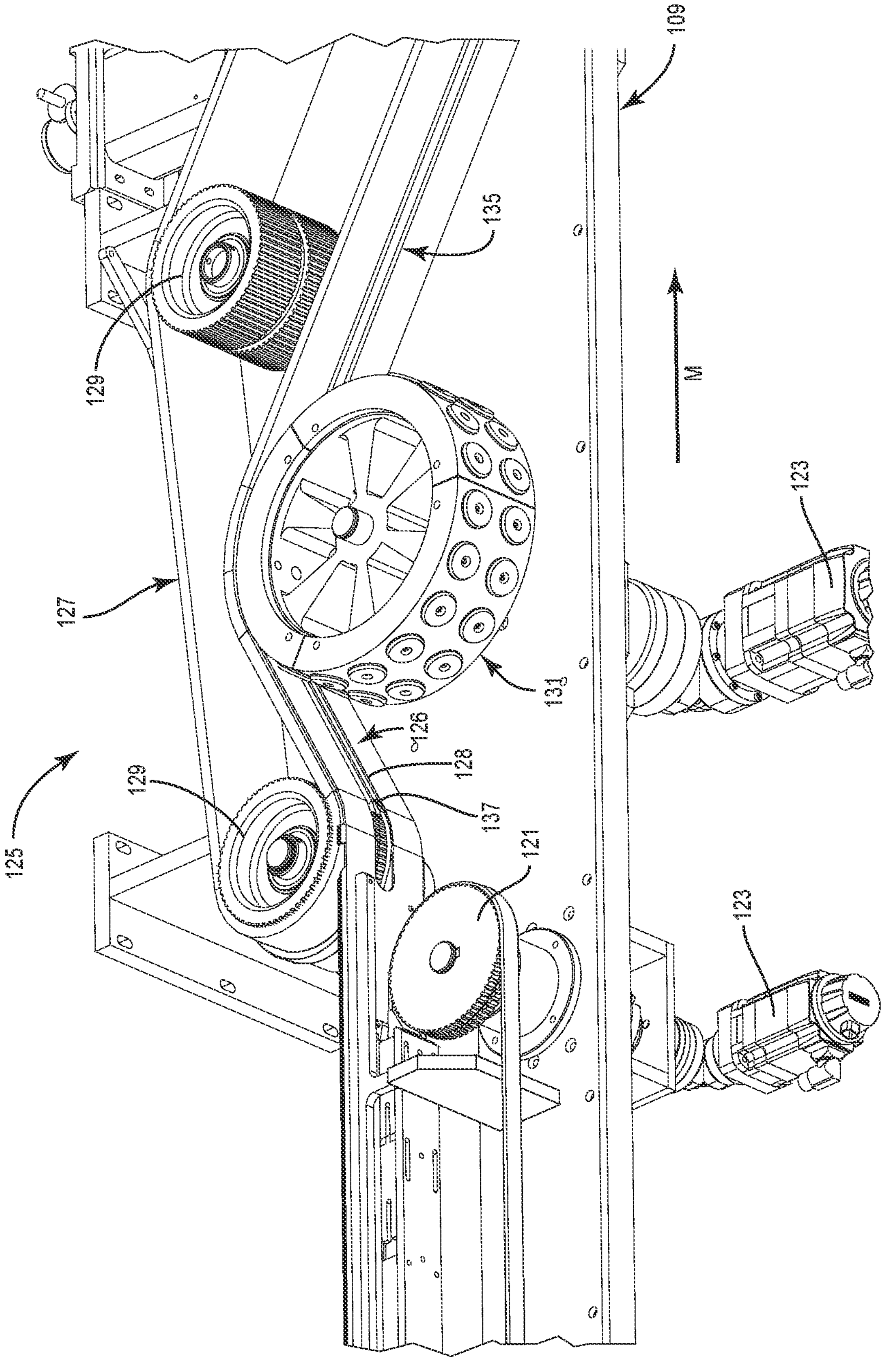
FIG. 7 is another enlarged perspective view of the blank processing assembly of the system of FIG. 3.
Figure 7A:
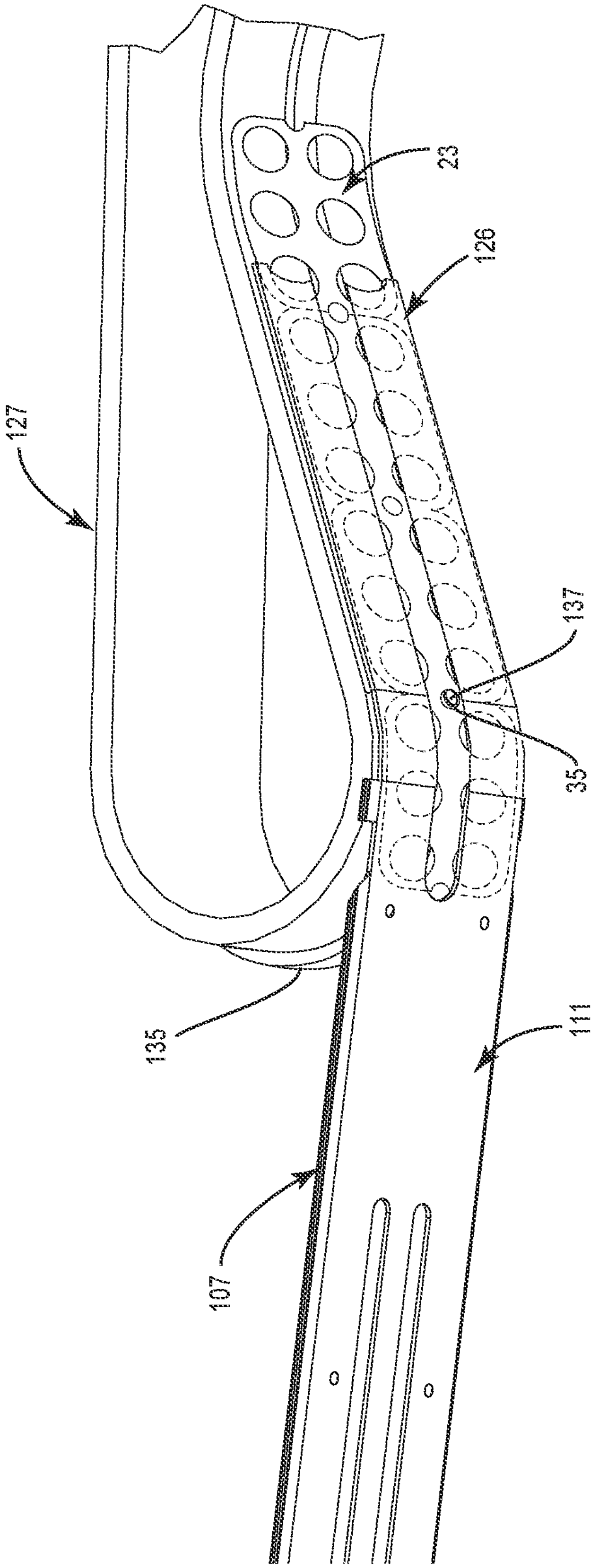
FIG. 7A is an enlarged perspective view of a portion of the blank processing assembly of the system of FIG. 3.

FIG. 3 generally illustrates a first exemplary embodiment of a system 100 for preparing/processing blanks 23 in accordance with the present disclosure. As described herein, the system 100 can be configured to pre-break, e.g., separate adjacent container retention tabs 29, e.g., at the lines of weakening 33 and/or at least partially folding the container retention tabs 29 upwardly at the respective fold line(s) 31 in preparation for at least partially receiving the respective containers. The system 100 can also be configured to separate blanks 23 from one another when fed into the system 100 as a set of at least partially attached blanks 23 and/or pre-breaking the blanks 23 can also include such separation of blanks 23.

The method and system 100 can include a machine frame supporting the various assemblies and components thereof described herein. The machine frame can include one or more of bases, legs, struts, tie bars, platforms, etc., in various arrangements, to provide a supporting structure for the assemblies and components described herein. For example, a machine frame can support such components above a base surface such as a ground or floor, and can provide access at one or more locations for human operators, e.g., to inspect, maintain, and/or otherwise operate the system 100. In one embodiment, the system 100 can be provided without an external frame.

With additional reference to FIG. 4-7A, the blanks 23 can move through the system 100 from an upstream end 103 to a downstream end 105 thereof generally in a downstream direction or machine direction M that defines/is parallel to a downstream direction with regard to the system 100 and such that the blanks 23 are engaged by various portions and components of the system 100. In this regard, an upstream direction with regard to the system 100 is a direction opposite the machine direction M/downstream direction.

The system 100 can include a blank infeed assembly 107 proximate the upstream end 103 thereof for receiving and sequentially distributing blanks 23 in the machine direction M of the system 100. Accordingly, the system 100 can include a feeder mechanism such as a hopper, chute, or other in-line or right-angle distribution mechanism.

As additionally shown, the blank infeed assembly 107 can include a generally vertical base or support 109 (broadly, "first support") upon which a bedplate 111 is mounted for supporting one or more of the blanks 23 from a feeder mechanism. The bedplate 111, as shown, can be a generally flat, elongate member defining a pair of generally parallel slots 113 therethrough extending at least a portion along the bedplate 111. The slots 113 are positioned to at least partially receive generally upright/upstanding blank engaging lugs 115 that are attached/coupled to a drive belt 117 looped around a first roller 119 and a second roller 121.

One or both of the first roller 119 and the second roller 121 can have an overall configuration and/or one or more surface elements for facilitating engagement with the drive belt 117, e.g., spurs, gears, spokes, treads, knurls, etc. Each of the first roller 119 and the second roller 121 can be rotatably mounted on the support 109 so as to rotate when driven by a rotation source, as described herein. In one embodiment, one or both of the first roller 119 and the second roller 121 can have the form of a gear or gear wheel.

In the illustrated embodiment, the system 100 can be provided with a motor 123 coupled to the second roller 121 with a suitable transmission mechanism, e.g. a transmission shaft, one or more sets of gearing, etc. to apply a rotational force to the roller 121 when activated, e.g., by an electrical signal. While the motor 123 is shown coupled to the roller 121 to cause rotation thereof, and the roller 119 is shown without an accompanying motor, it will be understood that an additional motor can be provided and coupled to the roller 119 to cause rotation thereof upon activation thereof. In one embodiment, a single motor can apply rotation to each of the roller 119, 121.

A motor as described herein can be any type of motor, engine, actuator, or other driving device that operates by converting energy, e.g., electrical energy and/or chemical fuel into a mechanical energy output.

With continued reference to FIGS. 3-7A, a blank processing assembly 125 can be positioned downstream from the blank infeed assembly 107 in the machine direction M. The blank processing assembly 125 can include a ramp 126 positioned adjacent/abutting a downstream end of the bedplate 111. The ramp 126, as shown, can be angled/sloped or otherwise shaped/oriented to extend further downstream along the blank processing assembly 125. In the illustrated embodiment, the ramp 126 is angled upwardly from the blank infeed assembly 107 toward a forming wheel 131, as described further herein.

The ramp 126 can be configured to support one or more of the blanks 23 and can include an elongate slot or track 128 to receive a portion of the blank processing assembly 125 to facilitate movement of the blank(s) 23 downstream in the blank processing assembly 125. While the ramp 126 is shown and described as being positioned downstream from the blank infeed assembly 107/bedplate 111, it will be understood that the ramp 126 can be considered a downstream portion of the blank infeed assembly 107/bedplate 111 without departing from the disclosure.

The blank processing assembly 125, as shown, can include a forming belt 127 extending around, e.g., forming an outer perimeter, about a series of rollers 129 such that the forming belt 127 is arranged in a closed path.

The rollers 129 can have one or more features for engaging the forming belt 127, e.g., spurs, gears, spokes, treads, knurls, etc. The rollers can be configured to rotate in a common direction, e.g., counterclockwise, to cause the forming belt 127 disposed thereabout in a desired direction. As also shown, one or more of the rollers 129 can be provided with a motor 123 to apply a rotational force thereto when activated, e.g. As described further herein, the rollers 129 can be driven and the forming belt 127 can be caused to move such that a portion of the forming belt 127 proximate a forming wheel 131 can generally move in the machine direction M.

The forming belt 127, as shown, can be a generally flat member having a plurality of openings 133 formed therethrough. The forming belt 127 can be formed of a material suitable to withstand applied tension and/or engagement with the respective rollers 129. In one embodiment, the forming belt 127 can include one or more of polymeric materials, composite materials, and metallic materials. In one embodiment, the forming belt 127 can include one or more reinforcing members, e.g., embedded structures, binders, braids, etc.

As described further herein, the openings 133 in the forming belt 127 can be formed in with a diameter/arrangement corresponding to that of the container openings 27 and container retention tabs 29 of the blank 23. The openings 133 can extend at least partially through a thickness of the forming belt 127, e.g., such that respective recesses are formed. In the illustrated embodiment, the openings 133 in the forming belt 127 can have the diameter D2 that corresponds to a distance from a curved fold line/portion of the curved fold line 31 to a diametrically opposed portion of the curved fold line/curved fold line 31 of the blank 23.

The aforementioned arrangement of the forming belt 127 is such that that when the forming belt 127 is arranged in a generally planar arrangement above a respective blank 23, respective openings 133 in the forming belt 127 can be aligned with the container openings 27 in the blank 23. While openings 133 are shown formed along a portion of the belt 127 in the illustrated embodiment, it will be understood that the openings 133 can be provided along a longer length of the forming belt 127 without departing from the disclosure.

A transport band 135 can be wrapped about an outward-facing surface of the forming belt 127, and as shown, can be positioned between rows of the openings 133 in the forming belt. One or more blank engaging members, e.g., lugs 137, can be coupled to the transport band 135 so as to follow the path of the forming belt 127 when the motors 123 are activated. In this regard, the lugs 137 are at least partially supported on the belt 127 via the transport band 135. It will be understood that the transport band 135 can have a different configuration, e.g., cables, belts, plates, rods, etc. In one embodiment, the transport band 135 can be formed of a stretchable material, e.g., an elastomeric material or otherwise elastically deformable and/or resilient material.

Figure 8:
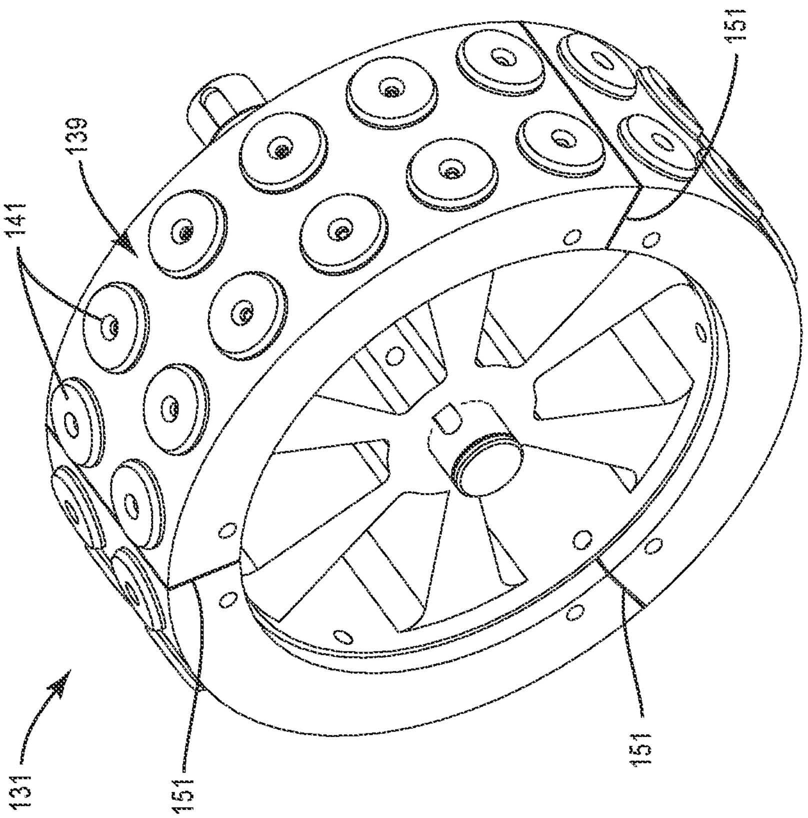
FIG. 8 is a perspective view of a forming wheel of the system of FIG. 3.
Figure 9:
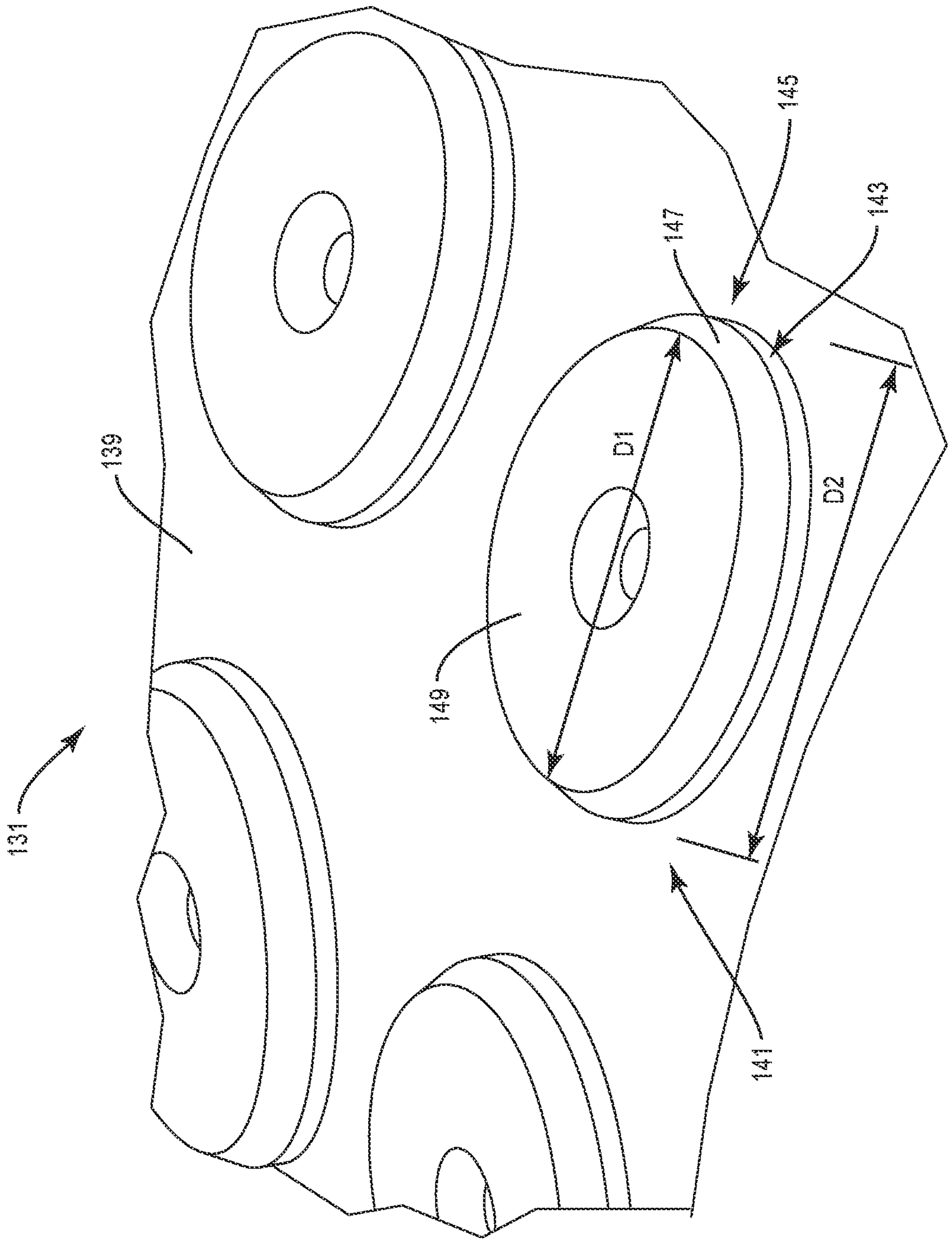
FIG. 9 is an enlarged perspective view of a portion of the forming wheel of the system of FIG. 3.
Figure 10:
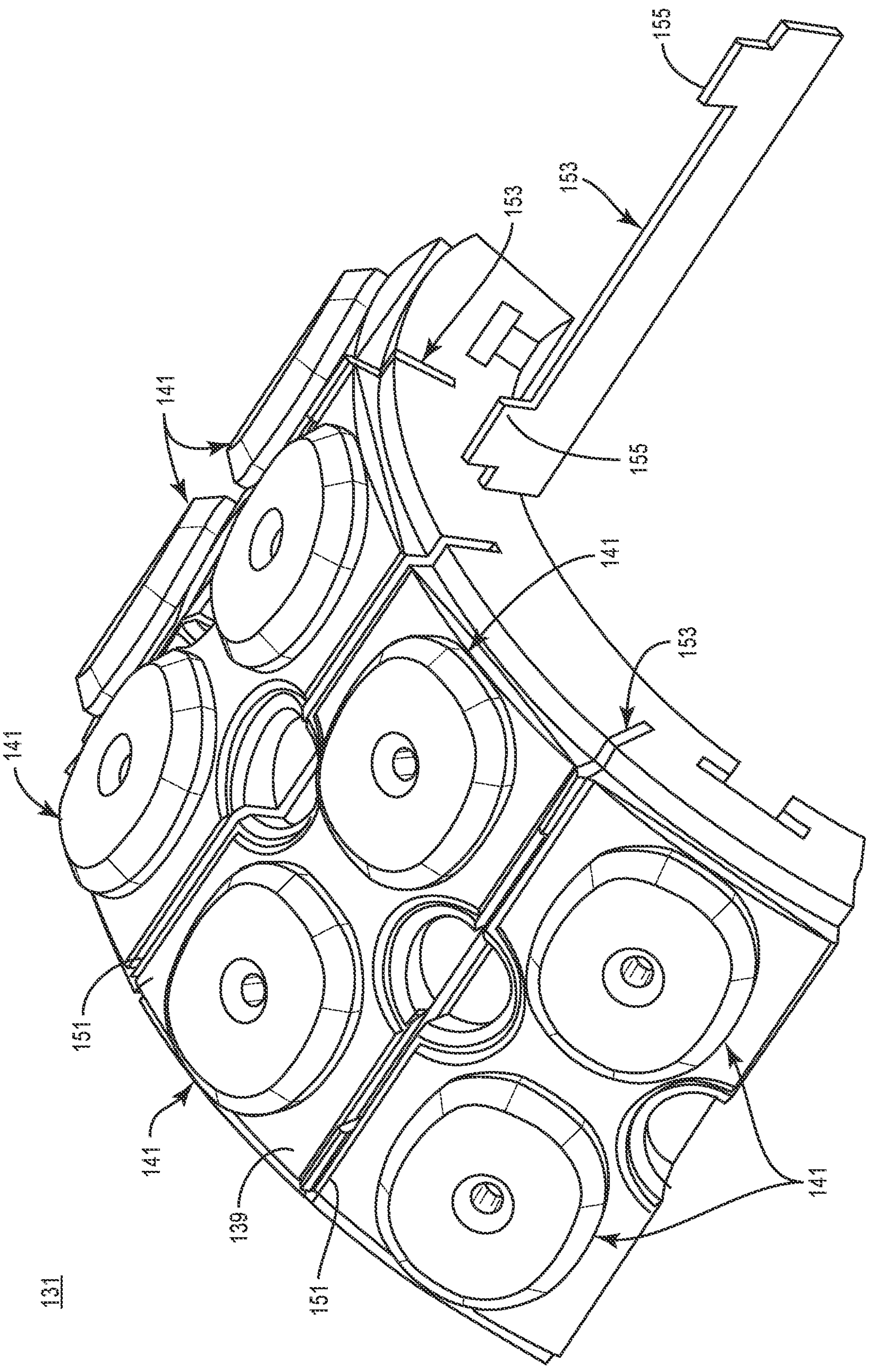
FIG. 10 is a perspective view of a portion of an alternative configuration of a forming wheel.

With continued reference to FIGS. 3-7A, and with additional reference to FIGS. 8 and 9, the forming wheel 131 can be rotatably mounted on the vertical support 109 and can be provided with a motor 123 and accompanying mechanical transmission/gearing to apply a rotational force thereto when activated. As shown, the forming wheel 131 can have an outer blank engaging surface 139 along the circumference of the forming wheel 131 that defines a plurality of forming members 141. As shown, one or more slots 151 can be defined along the forming wheel 131 interrupting the blank engaging surface 139. In some embodiments, the slots 151 can be for at least partially receiving cutting members, as described further herein.

The forming members 141 as shown, can be generally cylindrical protrusions defined along the blank engaging surface 139 and having a body portion 143 defining a diameter D2 generally corresponding to the diameter D2 of the container openings 27/container retention tabs 29 in the blank 23 and the diameter of the openings 133 in the forming belt 127. As also shown, the forming members 141 can have distal/free end portions 145 that taper to a diameter smaller than that of D2. In the illustrated embodiment, the distal end portion 145 of the forming members 141 can have a beveled surface 147, e.g., an angled or sloped surface having the general profile of a conic section, extending from an end of the body portion 143 to a distal end surface 149 of the respective forming member 141.

The distal end surface 149 of the respective forming members 141 can define a diameter generally corresponding to the diameter D1 between free edges of diametrically opposed tabs 29 across the container openings 27 of the blank 23. In the regard, the diameter of the forming members 141 transitions from the diameter D1 at the distal end surface 149 to the diameter D2 at the body portion 143 across the beveled surface 147. As described further herein, the distal end surface 149, the beveled surface 147, and/or the outer surface of the body portion 143 can be positioned and configured to contact respective portions of the blank 23. One or more of the forming members 141 can have a different configuration without departing from the disclosure. For example, one or both of the beveled surface 147 and/or the outer surface of the body portion 143 can have one or more intersecting planar surfaces/angled surfaces/segmented surfaces/further beveled surfaces therealong.

Turning to FIG. 9, an alternative configuration of the forming wheel 131 is generally designated 131A. The forming wheel 131A can include the slots 151 interrupting the blank engaging surface 139 and having a radial depth sufficient to at least partially receive respective cutting members 153 so as to position the cutting members 153 at least partially protruding from the blank engaging surface

139. The cutting members 153, as shown, can include one or more nick-breaking edges 155 for separating joined blanks 23, as described further below. In one embodiment, the slots 151 can be formed along one or more generally continuous portions of the blank engaging surface 139. In other embodiments, the forming wheel 131 can include multiple circumferential sections that are assembled to provide the blank engaging surface 139, with the slots 151 defined between adjacent sections of the forming wheel 131/blank engaging surface 139. It will be understood that the cutting members 153 can be provided in one or more of the respective slots 151 of the forming wheel 131 to provide the configuration described above.

As described herein, preparation/processing of the blank 23 for formation into a carrier with the system 100 can include one or more of separating adjacent container retention tabs 29, e.g., at the lines of weakening 33, and/or at least partially folding the container retention tabs 29 upwardly at the respective fold line(s) 31 in preparation for at least partially receiving the respective containers. It will be understood that the system 100 can have a different configuration than that described above in order to achieve the disclosed preparation/processing of the blanks 23.

It will also be understood that the system 100 described above can be adjusted to accommodate different types/arrangements/dimensions of blanks 23, e.g., so as to minimize the number of replacement/change parts involved with utilizing the system 100 for different blanks, e.g., to streamline operations and minimize downtime. For example, one or more adjustment controls, e.g., levers, knobs, toggles, buttons, tools (such as wrenches), can be coupled to one or more tolerance adjusting features of the system 100 (e.g., nuts, bolts, screws, clamps, vices, jacks, lifts, cranks, wheels, etc.).

As another example, a portion of the blank processing assembly 125, e.g., one or more of the rollers 129 and the forming wheel 131, as shown, can be mounted on a vertical support/base 110 (broadly, "second support") that is adjustable relative to the vertical support/base 109 supporting the remainder of the blank processing assembly 125 so as to change a distance between the forming belt 127 and the forming wheel 131. As shown, a lifting mechanism 112, e.g., a lift or jack (e.g., a hydraulic or pneumatic lift or jack, or other type of lift or jack) can be operably engaged with the vertical support/base 109 so as to lift or raise the vertical support/base 110 relative to the vertical support/base 109 in a vertical direction V, e.g., to bring the forming belt 127 into closer or further engagement with respect to the blank engaging surface 139 of the forming wheel 131 and/or other portions of the blank processing assembly 125 such as the ramp 126. In one embodiment, such lifting mechanism 112 can be driven by a motor 123.

With reference again to FIGS. 1-7A, a method of preparing blanks 23 with the system 100 according to an exemplary embodiment of the disclosure will be generally described.

One or more blanks 23 can be inserted into the blank infeed assembly 107, e.g., via placement onto the bedplate a feeder mechanism as described above. It will be understood that the system 100 can be configured to process a series of blanks 23 joined together at respective lateral lines of weakening. Such input of multiple successive blanks 23 into the system 100 can streamline loading operations, reduce alignment errors, etc.

As shown in FIG. 1, each container opening 27 can be spaced apart a longitudinal distance D3, e.g., corresponding to a distance in the machine direction M. The distance between container retention openings 27 adjacent a lateral edge of the blanks 27 and the lateral edge, e.g., at the line of weakening 37, in one embodiment, can be D3/2. In this regard, the distance between the general center of a container retention opening 27 adjacent a trailing edge of a blank 23 and that of a leading container retention opening 27 adjacent a leading edge of a next successive blank 23 can be D3 so that a longitudinal distance between successive container retention openings 23 within and across all adjacent joined blanks 23 can be D3. Such arrangement of the blanks 23/container openings 27 formed therein can also facilitate later engagement of the blank 23/carrier formed therefrom with products, as described further herein.

As each blank 23 reaches a generally planar engagement with the bedplate 111, e.g., so that an interior or downward-facing surface of the blank 23 is in at least partial face-to-face contact with the bedplate 111, the blank engaging lugs 115 can travel in a curved path about the roller 119 and positioned to extend upwardly through a pair of the container openings 27 at a leading edge of a respective blank 23. Further movement of the blank engaging lugs 115 through the respective slots 113 along the bedplate 111 in the machine direction M can cause the blank 23 to travel, e.g., through sliding engagement with the bedplate 111, in the machine direction M.

It will be understood that multiple pairs of blank engaging lugs 115 can be attached to the drive belt 117 in spaced apart relation along the machine direction M. In one embodiment, pairs of blank engaging lugs 115 can be spaced apart along the drive belt 117 a distance sufficient for a pair of blank engaging lugs 115 to extend upwardly through a respective pair of container openings 27 at a leading edge of each successive blank 23 of a plurality of attached blanks 23. In other embodiments, pairs of blank engaging lugs 115 can be spaced apart along the drive belt 117 a different distance, e.g., so that a pair of blank engaging lugs 115 are positioned to upwardly through a respective pair of container openings 27 at a leading edge of less than each successive blank 23 of a plurality of attached blanks 23. In some embodiments, the blank engaging lugs 115 can be positioned to extend upwardly through respective container openings 27 other than those at a leading edge of the respective blank 23.

Further driving of the drive belt 117 by the rollers 119, 121 causes the blank(s) 23 to move in the machine direction M and approach the ramp 126 and the blank processing assembly 125. Upon entering the ramp 126 (and upon activation of the motors 123 associated with the blank processing assembly 125), the forming belt 127 and the transport band 135 carried thereon can move into an alignment with a respective blank 23 slidably moving along the ramp 126 such that the blank 23 is positioned between the forming belt 127 and the ramp 126. In such alignment, openings 133 in the forming belt 127 can be positioned to overlie/align with the respective container openings 27 in the blank 23, e.g., such that a passage from the container openings 27 in the blank 23 to/through the openings 133 in the forming belt 127 is provided.

Such alignment of an aforementioned portion of the forming belt 127 with the blank 23 can also position a lug 137 carried on the transport band 135 to extend through the track 28 in the ramp 26 for at least partial insertion through/into at least the respective recess 35 of a respective blank 23 to further move the blank(s) 23 along the ramp 126.

Such action of the transport band 135/lug 137 can move the blank 23 into engagement with the forming wheel 131. As the forming wheel 131 rotates in the clockwise direction, the blank 23 and forming belt 127/transport band 135 positioned thereon can at least partially wrap/contour about the outer blank engaging surface 139 of the forming wheel 131 such that the blank 23 is positioned between the forming belt 127 and the forming wheel 131.

Figure 11:
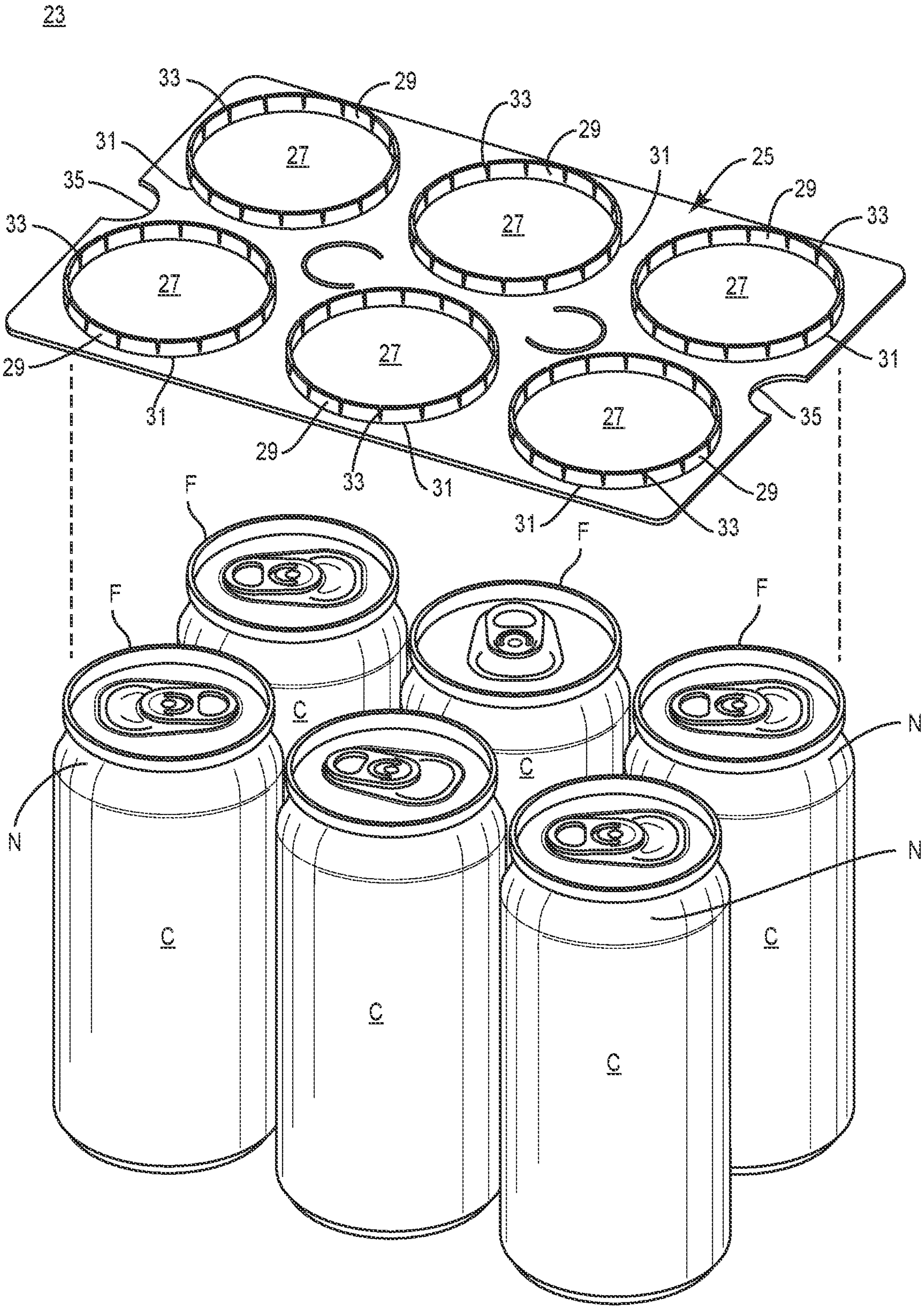
FIG. 11 is a perspective view of the blank of FIG. 1 having been processed by a portion of the system of FIG. 3.

In this arrangement, the forming members 141 extending outwardly from the forming wheel 131 can be positioned to extend through the respective container openings 27 in the blank 23 and at least partially into the openings 133 in the forming belt 127 thereabove. As a forming member 141 enters/extends through a respective container opening 27, the container retention tabs 29 can be contacted by the beveled surface 147 of the forming member 141 and urged to fold at least partially upwardly at respective curved fold lines 31/portions thereof. Such movement of the container retention tabs 29 can also cause respective adjacent container retention tabs 29 to at least partially separate from one another at respective oblique lines of weakening 33. The thickness of the forming belt 127/openings 133 therein can provide clearance for the container retention tabs 29 of the blank 23 to separate/extend upwardly as described above. An example of a blank 23 that has been pre-broken in such a manner is illustrated in FIG. 11.

In some embodiments, the pre-broken blanks 23 can be maintained in at least partial engagement with the forming belt 127 via frictional engagement of the container retention tabs 29 and the portions of the forming belt 127 defining the respective container openings 27.

In one embodiment, the cutting members 153 can be positioned protruding from the outer blank engaging surface 139 of the forming wheel 131 or 131A so as to be positioned to cut/break the line of weakening between a leading blank 23 (broadly, "first blank") and a next successive/trailing blank 23 (broadly, "second blank") when the blanks 23 are moved/passed over the forming wheel 131 or 131A. In this regard, the blanks 23 can be aligned relative to the movement of the system 100 such that the lines of weakening between successive blanks 23 are generally aligned with the cutting members 153/slots 151 associated with the forming wheels 131, 131A. In other embodiments, for example, configurations of the system 100 in which a forming wheel is provided without cutting members, successive blanks 23 can be separated via tension along a respective series of blanks 23 upon engagement with the forming wheels 131, 131A as described above.

Each blank 23 can thus be processed/pre-broken and separated from an adjacent blank 23 as it travels across the forming wheel 131. Such processing of the blanks 23 can facilitate later attachment of the blanks 23/carriers formed therefrom to respective containers. In this regard, the blanks 23 can be passed over the forming wheel 131 and applied directly to product containers or moved further downstream for such purpose, e.g., to a product engagement station. In one embodiment, the blanks 23 processed by the system 100 can be wrapped, stacked, packaged, otherwise prepared for transport/shipping.

In this regard, a downstream portion of the blank processing assembly 125 can form a product engagement portion 157 of the blank processing assembly 125/system 100 in which the one or more blanks 23 processed by the blank processing assembly 125 can be positioned/readied to be positioned over a series of products, e.g., containers C. Accordingly, the product engagement portion 157 of the blank processing assembly 125/system 100 can be positioned over a product conveyor or product grouping area such that the blanks 23 can be lowered onto a respective grouping of containers C. A pre-broken blank 23 is illustrated as positioned over and ready for engagement with a group of containers C in FIG. 11. In some embodiments, the pre-broken blanks 23 can have the configuration of a carrier, and can be provided with one or more containers C as a package.

In addition to the multiple streamlined operations performed by the system 100 to prepare the blanks 23 as described above, in embodiments in which multiple joined blanks 23 are processed by the system 100, such separated blanks 23 can exit the system 100/forming wheel 131 in a spacing such that a generally uniform longitudinal distance D2 can be provided between successive container retention openings 27 within and across all adjacent blanks 23 so that products, e.g., beverage containers C, can be transported/conveyed toward the processed blanks 23 in a generally uniform arrangement, e.g., without the need for product grouping or spacing to form specialized groups corresponding in number to the container openings 27 of each blank 23.

Figure 12:
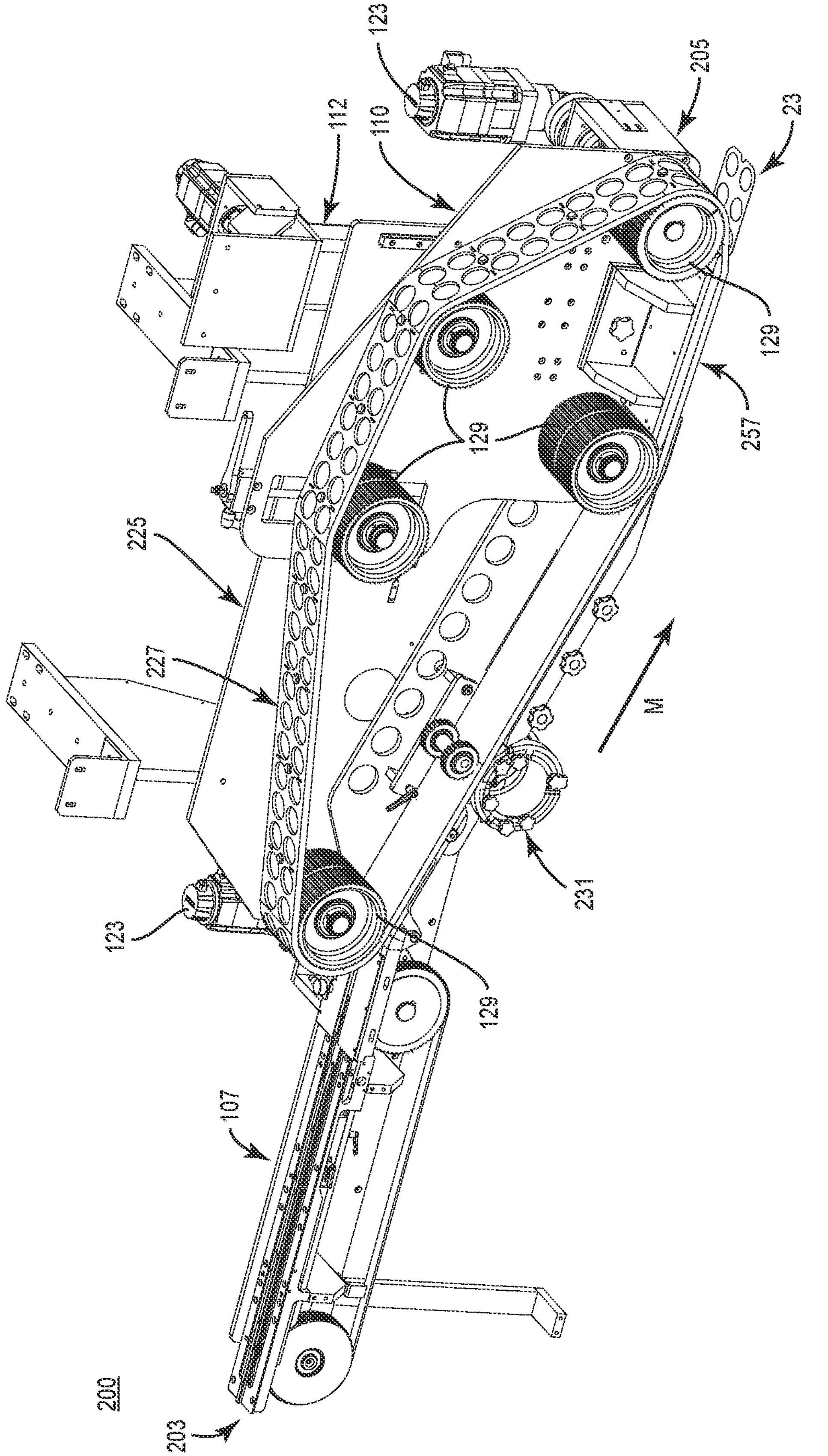
FIG. 12 is a perspective view of a system for processing blanks according to a second exemplary embodiment of the disclosure.
Figure 13:
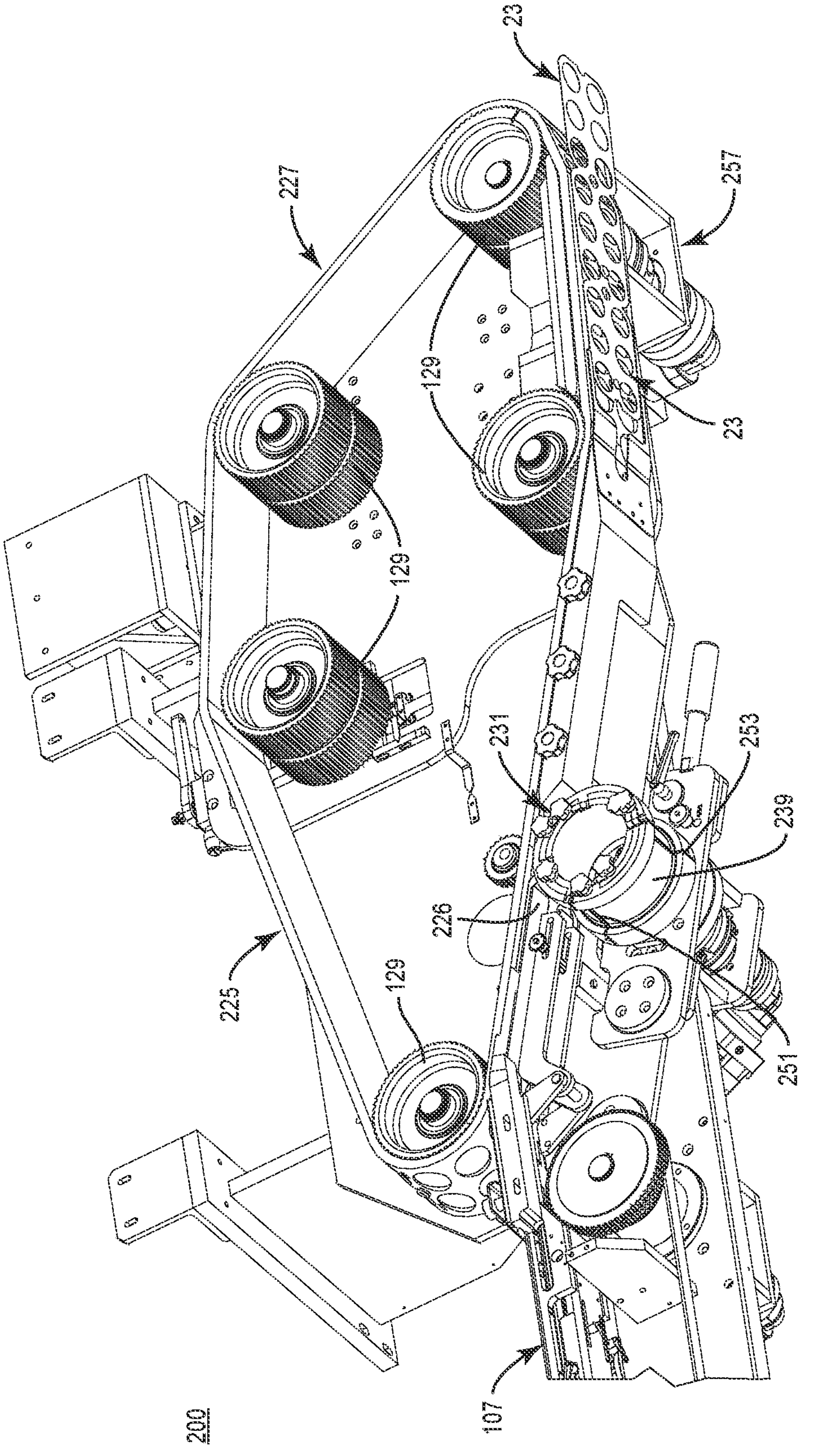
FIG. 13 is another perspective view of the system of FIG. 12.
Figure 13A:
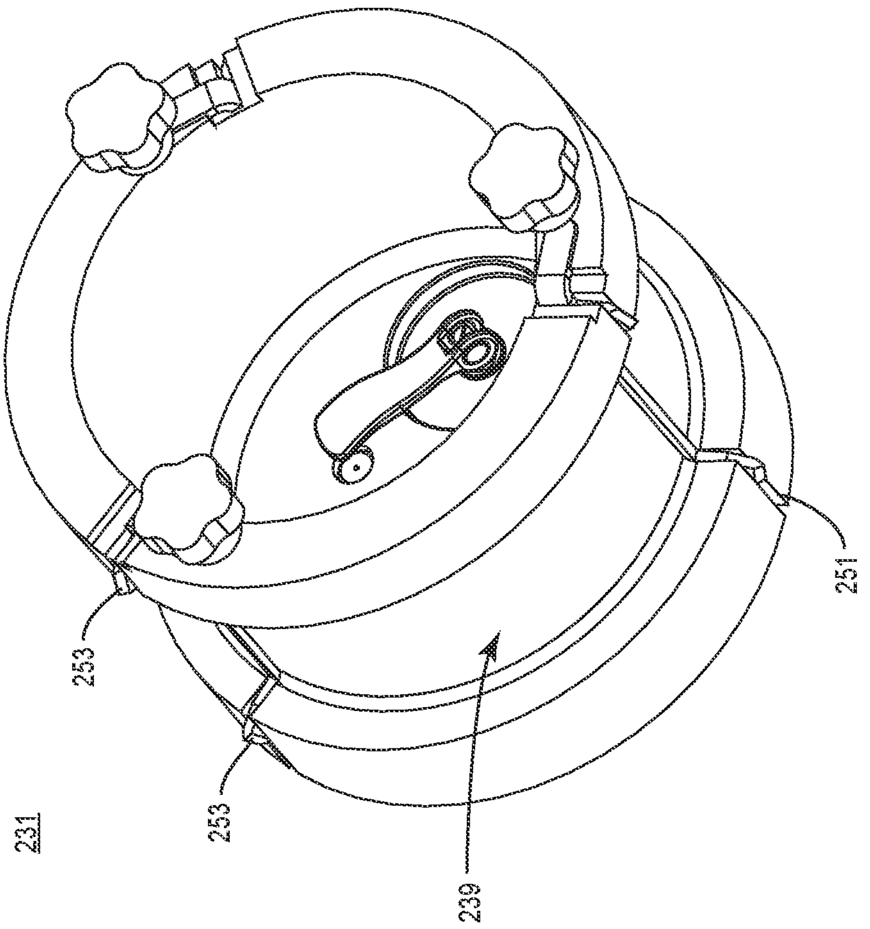
FIG. 13A is an enlarged perspective view of the forming wheel of the system of FIG. 12.

Turning to FIGS. 12, 13, and 13A, a system for preparing preparing/processing blanks 23 according to a second exemplary embodiment of the present disclosure is generally designated 200. The system 200 can have one or more features that are the same or similar to those described above with respect to the system 100, and like or similar features are designated with like or similar reference numerals.

As shown, the system 100 can have an upstream end 203 and a downstream end 205, the blank infeed assembly 107 proximate the upstream end 203, and a blank processing assembly 225 downstream from the blank infeed assembly 107. One or more motors 123 can be provided to rotationally drive one or more respective rollers of the respective blank infeed assembly 107 and/or blank processing assembly 225 as described above with respect to the system 100.

The blank processing assembly 225 can include a forming belt 227 that is generally similar to the forming belt 227 described above, e.g., a generally flat and looped member having the openings 133 extending to a depth at least partially through the forming belt 227. However, in the illustrated embodiment, the forming belt 227 can be provided without a transport band, and can instead be configured to at least partially receive or otherwise support one or more blank engaging members, e.g., the lugs 137.

In some embodiments, the forming belt 227 can be configured to receive/support lugs 137 at selected positions along the belt 227 such that a desired arrangement/interval of lugs 137 can be positioned along the belt 227 for engaging blanks 23 of different sizes and configurations.

The blank processing assembly 225 can further include a ramp 226 sloping generally downwardly from a downstream end portion of the blank infeed assembly 107 for receiving and moving blanks 23 along the blank processing assembly 225. In some embodiments, the ramp 226 can define one or more tracks for receiving a portion of the blank processing assembly 225, e.g., lugs, etc.

The ramp 226, as shown, extends generally obliquely downwardly from the blank infeed assembly 107 toward a forming wheel 231 and/or product engagement portion 257 of the blank processing assembly 225. The ramp 226 can be positioned in generally parallel arrangement with a portion of the forming belt 227, and can have a discontinuity along which a forming wheel 231 can at least partially intersect or abut the path of travel of the blank 23.

The forming wheel 231 can be rotatably mounted on the vertical support 109 and can be provided with a motor, such as a motor 123, and accompanying mechanical transmission/gearing to apply a rotational force thereto when activated. The forming wheel 231 has an outer blank engaging surface 239 along the circumference of the forming wheel 231. One or more slots 251 can be positioned interrupting the blank engaging surface 239 and having a radial depth sufficient to at least partially receive respective cutting members 253 so as to position the cutting members 253 at least partially protruding from the blank engaging surface 239.

The cutting members 253 can include one or more nick-breaking edges for separating joined blanks 23, as described further below. In some embodiments, cutting members or nick breaking edges can be formed as protrusions from the blank engaging surface 239 of the forming wheel 231.

In some embodiments, the forming wheel 231 can have the configuration of one of the forming wheels 131, 131A without departing from the disclosure.

According to one exemplary embodiment, the system 200 can receive one or more blanks 23 at the upstream end 203 thereof, e.g., at the blank infeed assembly 107, and proceed downstream through the blank infeed assembly 107 in the manner described above with respect to the system 100. Such activation and operation of the system 200 can include the activation of one or more of the motors 123.

Upon entering the ramp 226, the forming belt 227 can move into an alignment with a respective blank 23. In such alignment, openings 133 in the forming belt 127 can be positioned to overlie/align with the respective container openings 27 in the blank 23, e.g., such that a passage from the container openings 27 in the blank 23 to/through the openings 133 in the forming belt 227 is provided.

Such alignment of an aforementioned portion of the forming belt 227 with the blank 23 can also position a lug 137 carried on the forming belt 227 to extend into and/or through a track in the ramp 226 for at least partial insertion through/into at least the respective recess 35 of a respective blank 23 to further move the blank(s) 23 along the ramp 226.

Such movement of the blank(s) 23 along the ramp 226 can move the blank(s) 23 into engagement with the forming wheel 231 such that the blank 23 is positioned between the forming belt 227 and the forming wheel 231. As the forming wheel 231 rotates in the clockwise direction, the cutting members 253 can be positioned protruding from the outer blank engaging surface 239 of the forming wheel 231 so as to be positioned to cut/break the line of weakening between a leading blank 23 and a next successive/trailing blank 23 when the blanks 23 are moved/passed over the forming wheel 231. In this regard, the blanks 23 can be aligned relative to the movement of the system 200 such that the lines of weakening between successive blanks 23 are generally aligned with the cutting members 253/slots 251 associated with the forming wheel 231.

Each blank 23 can thus be separated from an adjacent blank 23 as it travels across the forming wheel 231. Such processing of the blanks 23 can facilitate later attachment of the blanks 23/carriers formed therefrom to respective containers. In this regard, the blanks 23 can be passed over the forming wheel 231 and applied directly to product containers or moved further downstream for such purpose, e.g., to a product engagement station. In one embodiment, the blanks 23 processed by the system 200 can be wrapped, stacked, packaged, otherwise prepared for transport/shipping.

In this regard, a downstream portion of the blank processing assembly 225 can form a product engagement portion 257 of the blank processing assembly 225/system 200 in which the one or more blanks 23 processed by the blank processing assembly 225 can be positioned/readied to be positioned over a series of products, e.g., containers C. Upon engagement with a grouping of containers C, the container retention tabs 29 of the respective blanks 23 can at least partially separate from one another at respective oblique lines of weakening 33 and fold at least partially upwardly at the respective fold line 31 into the configuration shown in FIG. 11.

In the illustrated embodiment, one or more portions of the blank processing assembly 225 can have an increased length in the machine direction M. For example, in some embodiments, the ramp 226 can have a generally increased length in the machine direction M and a disposition at a shallow oblique angle so as to permit processing of a blank 23 or a series of blanks 23 at generally longer lengths without a trailing end thereof becoming entangled/curved about the portion of the forming belt 227 in curved engagement with the roller 129. In some embodiments, the product engagement portion 257 can have a generally increased length in the machine direction M, e.g., to facilitate disengagement of the lugs 137 from the respective blanks 23 at the downstream end 203 of the system 200. In some embodiments, the portion of the forming belt 227 that curves about the roller 129 at the downstream end 203 of the system 100 can extend upwardly and rearwardly therefrom so as to facilitate such disengagement of the lugs 137 from the respective blanks 23.

In this regard, the system 200 can be configured to prepare/process blanks 23 with advantages similar to those described above with respect to the system 100.

It will be understood that one or more of the components of the systems described herein can have a different configuration without departing from the disclosure. It will be further understood that suitable supporting structures (e.g., bases, legs, platforms, supports, braces, etc.) can be provided to support and facilitate operation of the various components described herein.

In general, the blanks of the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method for processing at least one blank for forming a carrier for containers, comprising:

obtaining at least one blank comprising a central panel having plurality of container openings and at least one container retention tab extending into respective container openings of the plurality of container openings;

inserting the at least one blank into a blank infeed assembly;

moving the at least one blank from the infeed assembly to a blank processing assembly, the blank processing assembly comprising a forming belt, the blank processing assembly further comprising a forming wheel and at least one cutting member protruding from the forming wheel for engaging the at least one blank;

moving the at least one blank between the forming belt and the forming wheel; and moving the at least one blank to a product engagement portion of the blank processing assembly such that the at least one blank is positioned for engagement with a group of containers.

2. The method of claim 1, wherein the forming belt comprises a plurality of openings, and the method further comprises aligning respective openings of the plurality of openings of the forming belt with respective container openings of the plurality of container openings of the at least one blank.

3. The method of claim 2, wherein the at least one blank is a first blank and separably connected to a second blank, at and moving the at least one blank between the forming belt and the forming wheel comprises separating the first blank from the second blank.

4. The method of claim 2, wherein the forming wheel comprises a plurality of forming members protruding therefrom, and moving the at least one blank between the forming belt and the forming wheel further comprises at least partially receiving a respective forming member of the plurality of forming members in a respective opening of the plurality of openings of the forming belt.

5. The method of claim 4, wherein moving the at least one blank between the forming belt and the forming wheel further comprises at least partially folding at least one container tab of the at least one blank relative to a respective container opening of the plurality of container openings.

6. The method of claim 2, wherein the forming belt supports at least one lug protruding therefrom, and the method further comprises moving the at least one blank at least partially along the blank processing assembly by engaging the at least one lug with a portion of the at least one blank.

7. The method of claim 6, wherein moving the at least one blank from the blank infeed assembly to the blank processing assembly comprises slidably moving the at least one blank along a ramp extending upwardly from the blank infeed assembly toward the forming wheel.

8. The method of claim 6, wherein moving the at least one blank from the blank infeed assembly to the blank processing assembly comprises slidably moving the at least one blank along a ramp extending downwardly from the blank infeed assembly toward the forming wheel.

9. The method of claim 2, wherein the blank infeed assembly and the forming wheel are at least partially mounted on a first support, at least a portion of the blank processing assembly is mounted on a second support, and the method further comprises moving the first support relative to the second support to change a distance between the forming belt and the forming wheel.

10. A system for processing blanks for forming carriers for containers, the system comprising:

an upstream end;

a downstream end defining a machine direction from the upstream end to the downstream end of the system;

a blank infeed assembly proximate the upstream end of the system;

a blank processing assembly positioned downstream from the blank infeed assembly, the blank processing assembly comprising a forming belt for being driven in a closed path about a plurality of rollers, a forming wheel rotatably mounted to a support, and at least one cutting member protruding from the forming wheel for separating adjacent blanks, the forming belt and the forming wheel are arranged such that at least one blank is for being at least partially received between the forming belt and the forming wheel and processed before being moved to a product engagement portion of the blank processing assembly.

11. The system of claim 10, wherein the forming belt comprises a plurality of openings for being aligned with respective container openings of a plurality of container openings of the at least one blank.

12. The system of claim 11, wherein the forming wheel comprises a blank engagement surface interrupted by at least one slot, the at least one cutting member being at least partially received in the at least one slot.

13. The system of claim 11, wherein the forming wheel comprises a plurality of forming members protruding therefrom and positionable for at least partial insertion in a respective opening of the plurality of openings of the forming belt.

14. The system of claim 13, wherein at least one forming member of the plurality of forming members comprise a body portion and a tapered distal portion, the body portion having a diameter corresponding to a diameter of a respective opening of the plurality of openings in the forming belt.

15. The system of claim 11, wherein the forming belt supports at least one lug protruding therefrom, the lug configured for engagement with at least one blank.

16. The system of 15, wherein a transport band is at least partially disposed about the forming belt, the at least one lug is supported on the transport band.

17. The system of claim 16, wherein the blank processing assembly comprises a ramp extending downwardly from the blank infeed assembly toward the forming wheel.

18. The system of claim 11, wherein the blank processing assembly comprises a ramp extending upwardly from the blank infeed assembly toward the forming wheel.

19. The system of claim 11, wherein the blank infeed assembly and the forming wheel are at least partially mounted on a first support, at least a portion of the blank processing assembly is mounted on a second support, and the second support is movable relative to the first support.

* * * * *